UNITED STATES PATENT OFFICE.

WILLIAM B. ROSEVEAR, JR., OF DETROIT, MICHIGAN.

PROCESS OF MAKING A FILLER FOR RUBBER OR PAINT.

1,237,704.  Specification of Letters Patent.  Patented Aug. 21, 1917.

No Drawing.   Application filed December 9, 1916.   Serial No. 135,997.

*To all whom it may concern:*

Be it known that I, WILLIAM B. ROSEVEAR, Jr., a citizen of the United States, residing at Detroit, county of Wayne, State of Michigan, have invented a certain new and useful Improvement in Processes of Making Fillers for Rubber or Paint, and declare the following to be a full, clear, and exact description of the same, such as will enable others skilled in the art to which it pertains to make and use the same, reference being had to the accompanying drawings, which form a part of this specification.

My invention relates to a process for making a filler for rubber, paint or other similar material and the product produced by said process.

Objects of my improvements are to utilize what has hitherto been a waste product and to produce a product which is cheap and, which when incorporated with the rubber, paint, or the like shall produce a superior substance.

These objects are secured by taking the lime-cake or substance chemically precipitated in the process of purifying the juices in the manufacture of beet sugar, and pulverizing the same to reduce the caking formed in drying. I then subject this substance to a temperature of about 500° F. for about an hour with free access of air to the same, which I secure by continually stirring the substance while being heated and freely supplied with air. This drying or "roasting" may be carried out in a rotary drum with longitudinal steps to keep the substance tumbling, or with a spiral web to keep it tumbling and passing from end to end of the roaster at the same time. The temperature must be kept below 600° F. to avoid producing an undesirable alkalinity to the product. The free access of air is necessary to prevent the discoloring of the material. The roasting temperature should be maintained as high and for as long a time as is necessary to drive off all volatile organic matter.

By this process a very fine filler is produced which on being incorporated with rubber makes a dense and serviceable article and which is very cheap and produces a superior article wherever incorporated as a filler with other substances.

Hitherto the lime-cake or precipitate utilized in this process has been a waste product and by this process it is made very useful and valuable.

What I claim is:

1. The process of producing a filler consisting in subjecting the precipitate produced in clarifying the juice in sugar manufacture to a degree of temperature adapted to drive off the moisture without discoloring the product.

2. A filler produced by subjecting the precipitate formed in clarifying the juice in sugar manufacture in the presence of free access of air to a sufficient degree of temperature to drive off the moisture therefrom without discoloring the product.

3. The process of producing a filler consisting in subjecting the precipitate produced in clarifying the juice in sugar manufacture to a degree of temperature adapted to drive off the moisture and volatile organic matter without discoloring the product.

4. A filler produced by subjecting the precipitate formed in clarifying the juice in sugar manufacture in the presence of free access of air to a sufficient degree of temperature to drive off the moisture and volatile organic matter without discoloring the product.

In testimony whereof, I sign this specification.

WILLIAM B. ROSEVEAR, JR.